United States Patent
Pickrell (10) Patent No.: US 10,178,862 B1
(45) Date of Patent: Jan. 15, 2019

(54) INSECT CATCHER

(71) Applicant: David J. Pickrell Pickrell, State College, PA (US)

(72) Inventor: David J. Pickrell Pickrell, State College, PA (US)

(*) Notice: Subject to any disclaimer, the term of this patent is extended or adjusted under 35 U.S.C. 154(b) by 280 days.

(21) Appl. No.: 15/060,852

(22) Filed: Mar. 4, 2016

Related U.S. Application Data (60) Provisional application No. 62/129,185, filed on Mar. 6, 2015, provisional application No. 62/151,041, filed on Apr. 22, 2015.

(51) Int. Cl.
*A01M 1/14* (2006.01)
*A01M 3/04* (2006.01)
*A01M 3/00* (2006.01)

(52) U.S. Cl.
CPC .............. *A01M 3/04* (2013.01); *A01M 1/14* (2013.01); *A01M 3/00* (2013.01)

(58) Field of Classification Search
CPC ............. A01M 1/00; A01M 1/14; A01M 3/04
USPC ....... 43/107, 114, 124, 131, 132.1, 133, 136
See application file for complete search history.

(56) References Cited

U.S. PATENT DOCUMENTS

| | | | | |
|---|---|---|---|---|
| 483,079 | A * | 9/1892 | McAdams | A01M 3/00 43/134 |
| 984,332 | A * | 2/1911 | Whitehead | A01M 3/02 43/137 |
| 995,886 | A * | 6/1911 | Means | A01M 3/00 43/134 |
| 3,310,024 | A * | 3/1967 | McConnell | G08B 5/002 116/210 |
| 3,330,063 | A * | 7/1967 | Lockwood | G01N 1/14 43/134 |
| 3,735,723 | A * | 5/1973 | Lutz | G08B 5/002 116/210 |
| 4,068,675 | A * | 1/1978 | Pappanikolaou | A45B 19/02 135/20.2 |
| 5,301,631 | A * | 4/1994 | Vining | B64B 1/50 116/210 |
| 5,537,777 | A * | 7/1996 | Geeting | A01M 3/00 15/119.1 |
| 5,857,881 | A * | 1/1999 | Zippel, Sr. | A01K 87/007 43/25 |

(Continued)

FOREIGN PATENT DOCUMENTS

JP  2014-140353  * 8/2014

OTHER PUBLICATIONS

Machine translation of JP Patent No. 2014-140353, by Yuda, "Insect pest trap for rice farms, fruit trees, and vegetables, has lubricating agent which is coated to capture screen surface and inner surface of capture container", Aug. 7, 2014. (Year: 2014).*

*Primary Examiner* — David J Parsley
(74) *Attorney, Agent, or Firm* — John Elnitski, Jr.

(57) ABSTRACT

An insect catcher for trapping insects. The insect catcher includes a handle assembly to receive and manipulate a trap for trapping insects. The insect catcher includes a trap to capture and dispose of an insect without an operator of the handle assembly contacting the insect, the trap removably attached to the handle assembly The insect catcher includes an inflatable material as part of the trap which expands and is adapted to have direct contact with the insect to be trapped.

19 Claims, 7 Drawing Sheets

(56) References Cited

U.S. PATENT DOCUMENTS

| | | | | |
|---|---|---|---|---|
| 6,169,081 B1* | 1/2001 | Ishiwatari | ............... | A01N 25/34 |
| | | | | 424/405 |
| 6,893,068 B1* | 5/2005 | Varner | ....................... | B25B 9/00 |
| | | | | 294/24 |
| 9,339,092 B2* | 5/2016 | Vaitl | ....................... | A45B 19/02 |
| 2013/0030519 A1* | 1/2013 | Tran | ....................... | A61F 2/2433 |
| | | | | 623/2.11 |
| 2013/0047498 A1* | 2/2013 | Keim, Jr. | ................. | A01M 3/04 |
| | | | | 43/136 |

* cited by examiner

INSECT CATCHER

This application claims the benefit of and incorporates by reference U.S. Provisional Applications No. 62/129,185, filed Mar. 6, 2015 and 62/151,041, filed Apr. 22, 2015.

BACKGROUND

The field of invention generally relates to insect control. More specifically, the present invention relates to insect capture and disposal using a device.

Insects are known to enter areas where it is undesirable to have them. Examples of such areas are inside the living, sleeping, & dining spaces in the home; in garages, basements, porches, decks, yards; and various businesses including offices, factories, commercial businesses, retail business, etc. Examples of the type of unwanted insects include spiders, ants, roaches, centipedes, water bugs, flies, bees, hornets, wasps, among many others. Some of these may be physically harmless but some can be dangerous such as poisonous spiders, e.g. brown recluse or black widows.

There are many products available for preventing insects from entering into unwanted areas or removing them when they do appear. These can be divided into two main categories depending on whether a user must operate the device at the time the insect is captured or killed. The first category of products is made up of devices or chemicals used for killing or capturing insects and work automatically or continuously while a person is not around. Included in this category are insecticides sprayed over surfaces by exterminators or by the homeowner, bug zappers, roach traps, fly paper etc. Some of these bait the insects in and others are just applied to surfaces the insects normally occur and various means are used to kill the insect including immobilization using adhesive, electrifying, or killing with chemicals.

The second category of products is made up of devices or chemicals for manually killing or removing an insect once it has been spotted by a user. These include insecticide spray which is applied directly to the insect, flyswatters, insect vacuums, etc. All of the approaches and devices in this second category involve the manual killing or removing of insects from unwanted areas and suffer from major disadvantages.

One common way for a homeowner to kill an insect is to use toilet paper, Kleenex, paper towel, etc. to crush the insect by hand. The problems with this method are obvious and include the requirement to come close to the insect and risk being stung or bitten; having the insect fall on you if reaching above your head; missing the insect because it can see you coming close to it; feeling the crushing sensation (which some find distasteful); and the difficulty in finding the insect in the tissue to be sure it was captured and killed. In addition, in many instances the insect is difficult to reach with a hand held tissue. This may because it is located high on a wall or on the ceiling which requires the homeowner to then stand on a chair, coffee table, step ladder, etc. to reach it. An insect may also be hard to reach because it is located behind an object such as a sink pedestal, toilet, couch, etc. A second very common device used to kill insects is the common household fly swatter. The major problems associated with this are that it smashes the insect on the surface leaving residue on the surface and on the fly swatter and it is not good for killing insects in corners or crevices or irregular surfaces.

Another way for a person to manually kill an insect is to spray insecticide directly onto the insect. Disadvantages of this approach are that they expose the operator to toxic chemicals which can get on the operator, e.g. hands or face. These hazardous chemicals can remain on surfaces, e.g. tables and countertops and potentially expose children and pets to these chemicals either by remaining on surfaces or while stored in cans. After the use of the spray, the dead or immobilized insect still needs to be picked up and placed in the trash by hand.

Another way to catch insects in the home is with a vacuum cleaner using a suction handle attachment. The handle has the advantage of keeping the insect away from the person while catching it. However, this approach does not ensure the insect has been killed and there is a possibility of its future escape from the vacuum bag. In addition, with common vacuum cleaners, because the handle has a hose attached to the floor unit, the mobility of the handle is reduced. Hand held vacuum cleaners suffer from lower suction power and small or inappropriately shaped mouth openings for catching insects. Also, short throats of hand held vacuums force the operator to come closer to the insect. There are hand held vacuums designed specifically for the purpose of catching insects that were designed to overcome some of these limitations. These devices have longer throats for reaching insects without the operator being close to them. They typically have bowl shaped mouth openings for greater chance of surrounding the insect to prevent escape and have a high voltage grid in the base which will kill the insect by burning it. They are usually cordless for easy mobility. The major disadvantage of such an insect catcher is that the bowl shaped end is rigid and does not work well when insects are in corners or crevices. The head is also large and does not work well for hard to reach places such as behind toilets. In addition, it is not always easy to see if the insect was captured and killed after its use and these vacuums are relatively expensive compared to flyswatter and insect sprays.

Figure 1:
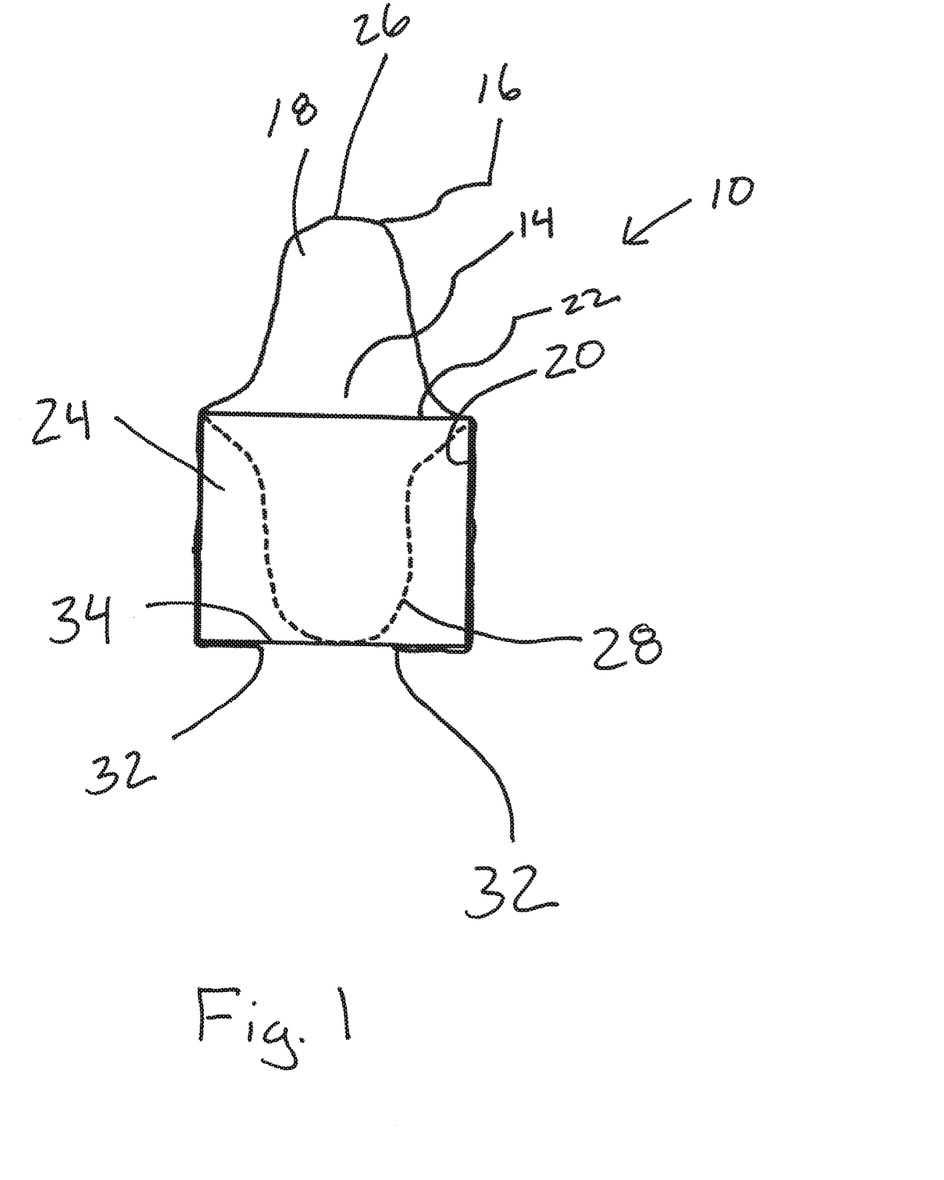
FIG. 1 is a side view of a trap according to the present invention.

Another commercially available device designed specifically for larger spiders is shown in FIG. 1. This device has a brush head which closes around a large spider when the trigger is pulled to allow it to be restrained until it can be taken outdoors and released. This type of device appeals to those individuals who would prefer a "catch and release type of device which does not kill. Its disadvantages include that it does not satisfy other homeowner who want to see that the insect has been killed so it cannot return to the house, it will not work well with small spiders or other types of insects, and it requires handling of a live large spider.

It is an object to provide a device for capturing and disposal of insects.

SUMMARY OF THE INVENTION

An insect catcher for trapping insects. The insect catcher includes a handle assembly to receive and manipulate a trap for trapping insects. The insect catcher includes a trap to capture and dispose of an insect without an operator of the handle assembly contacting the insect, the trap removably attached to the handle assembly The insect catcher includes an inflatable material as part of the trap which expands and is adapted to have direct contact with the insect to be trapped.

DETAILED DESCRIPTION

The insect catcher provides for a quick and convenient way of trapping and disposing of unwanted insects in the home and business. In addition, the insect catcher can be made at low cost and is environmentally friendly. The insect catcher of FIGS. 1-7 include two main components. The first component is a replaceable and disposable trap 10 used to capture the insect for disposal. The second component is a reusable handle assembly 12 to hold and actuate the trap 10.

Figure 2:
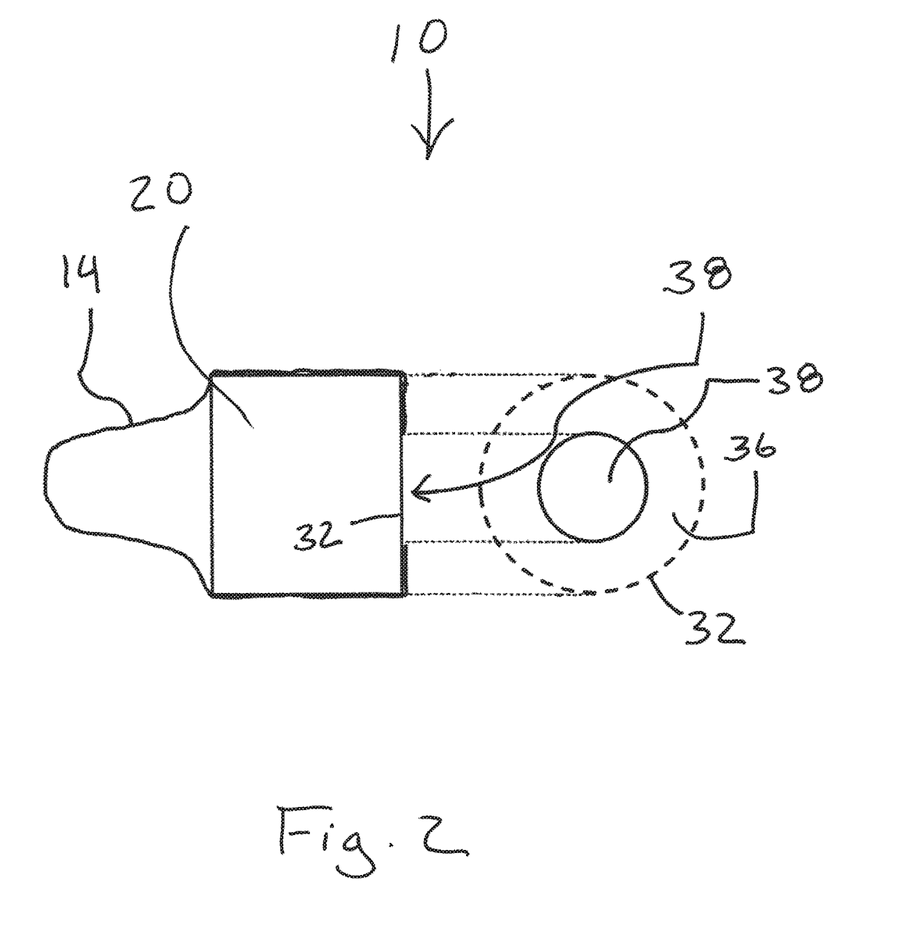
FIG. 2 is a cross sectional side and end view of the trap of FIG. 1 according to the present invention.

FIG. 1 shows the disposable trap 10 to include three parts. The first part is an inflatable material that expands under air pressure. In FIG. 1, the inflatable material is shown as a typical balloon 14 having a round shape and one opening at the bottom for air intake. The second part is a sticky substance layer 16 on the outer surface 18 of the balloon 14. The third part is a container which holds the balloon during shipment, storage, use, and disposal. The container provides structure to the trap 12. FIG. 1 shows the balloon 14 attached to the container, where the container is shown as a cardboard tube 20. The open end of the balloon 14 has been stretched around the top 22 and side wall 24 of the cardboard tube 20. The balloon 14 is secured to the cardboard tube 20 by gluing an inside surface of the balloon 14 to an outside surface of the side wall 24 of the tube 20. The glue prevents the balloon 14 from slipping off the cardboard tube 20 when the balloon 14 is inflated. The balloon 14 can be a common party balloon made of rubber that is typically twelve inches in diameter when inflated. Other sizes and materials that can be wrapped around the cardboard tube 20 and inflated can also be used instead of the balloon 14. The cardboard tube 20 is typically a cylinder, but could be other shapes. In FIG. 1, the balloon 14 can be seen resting in an outward position outside the tube 20 shown by the solid line 26, but could also be as sitting in an inward position inside the tube 20 shown by the dotted line 28. As can be seen in FIG. 1, the bottom opening 32 of the balloon 14 has been stretched around the bottom edge 34 of the wall 24 that forms an opening 36 in the bottom of the cardboard tube 20. The bottom opening 32 closes off part of the opening 36 of the cardboard tube 20. FIG. 2 shows a cross sectional view of the trap 10 and a bottom view of the trap 10 together. The bottom view shows the cardboard tube 20 with the balloon 14 stretched over the bottom edge 32 of the cardboard tube 20 to enclose a portion of the opening 36 of the cardboard tube 20 to form a smaller opening 38 into the tube 20 and the balloon 14.

The outer surface 18 of the balloon 14 is coated with the sticky substance layer 16 to adhere the insect to the balloon 14. Tanglefoot insect trap adhesive has been successfully used as the sticky substance layer 16, but other substances could be also be used. The advantage of the Tanglefoot composition, which is based on tree resin and wax, is that it stays sticky even when exposed to air for months or even years. Other compositions may require the outside surface 18 of the balloon 14 to be protected and sealed prior to use to prevent the sticky substance layer 16 from drying out. The sticky substance layer 18 would have a tackiness and thickness which would cause the insect to adhere to the sticky substance layer 16, but not damage a surface. Examples of damage are pulling off paint, pulling off wallpaper or leaving residue of the sticky substance layer 18 on the surface where the insect was trapped.

Figure 3:
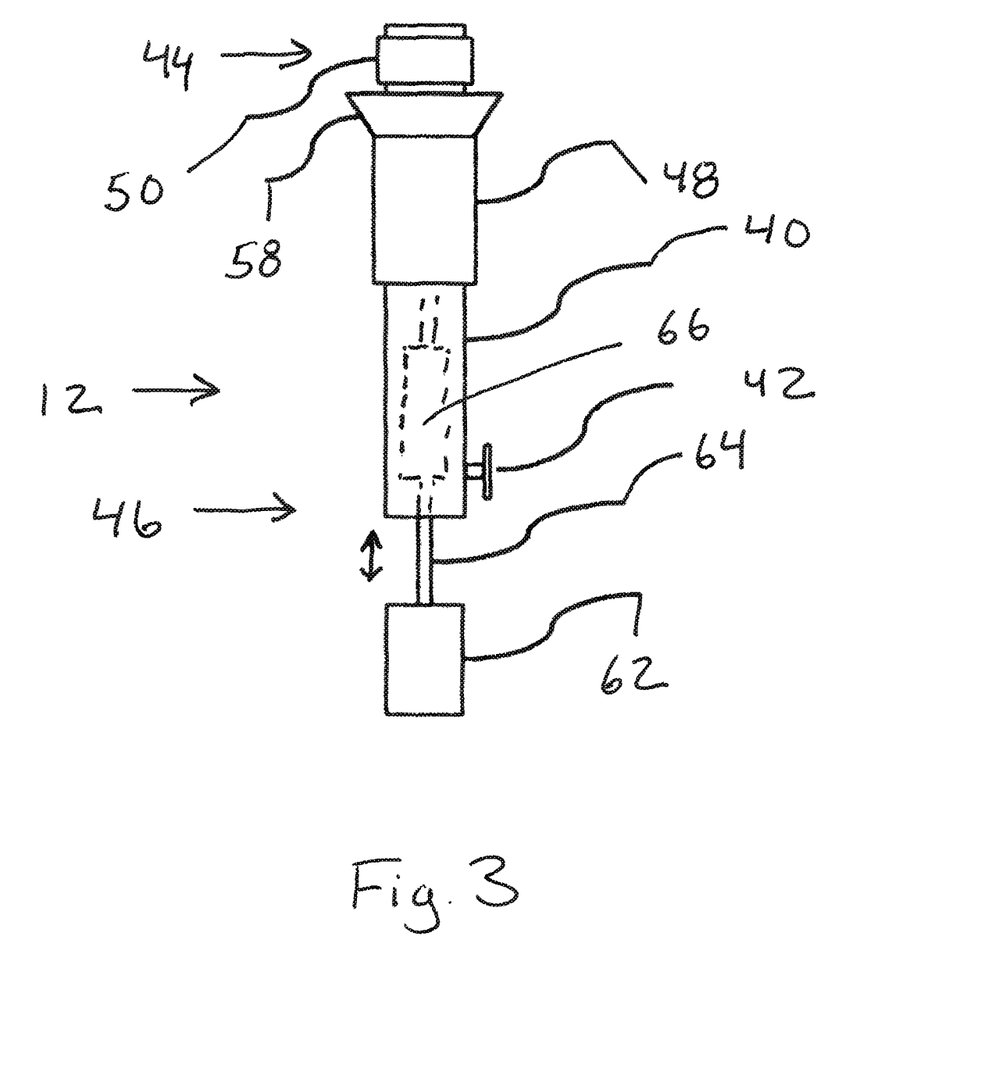
FIG. 3 is a cross sectional side view of the trap and trap end according to the present invention.

The function of the handle assembly 12 is to hold the trap 10, inflate the trap 10, keep the insect at a distance from the operator, deflate the trap 10 and release the trap 10. The handle assembly 12 includes five main components, as shown in FIG. 3. The handle assembly includes a handle body 40, a trap clamp, an air pump and an air pressure release device 42. The handle body 40 is a round hollow plastic tube to which the other main components are attached. PVC pipe or polycarbonate tubing can be used for the handle body 40. The handle body 40 includes a trap end 44 and an inflator end 46. A home size insect catcher would have a handle body 40 between two to four feet in length. It is envisioned that handle body 40 could have the feature of an adjustable length to make the insect catcher user friendly. The length could be increased by adding additional pipe sections to the handle body 40 or increased with an adjustable length pipe, such as one with an inner tube that can be pulled out of an outer tube in a telescoping fashion.

Figure 4:
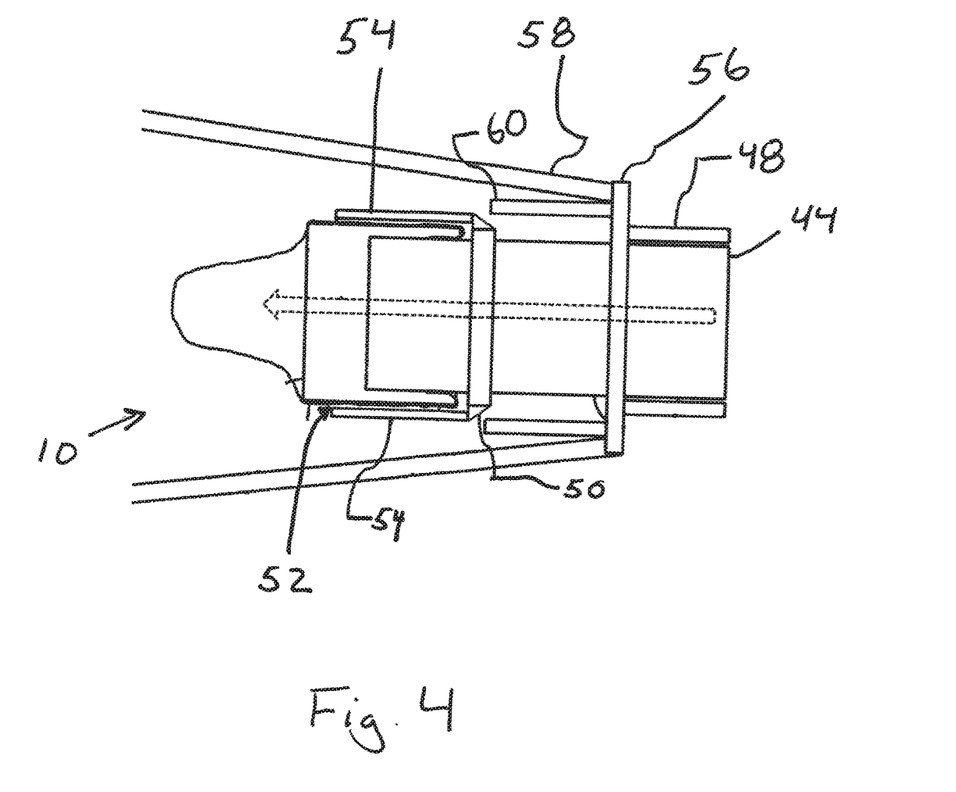
FIG. 4 is a side view of an insect trap according to the present invention.

FIG. 4 shows the trap 10 being attached to the trap end of the handle body 40. The trap clamp includes a clamp assembly, carriage 48 and collet 50. The trap 10 is attached to handle body 40 by inserting the trap 10 over the trap end 44 of the handle body 40. The trap 10 is place so that the balloon covered cardboard tube 20 is placed in a clamp space 52 between collet fingers 54 of the collet 50 and the trap end 44 of the handle body 40. The collect fingers 54 are flexible and can be pressured towards the cardboard tube 20. Once the trap 10 is attached to the handle body 40, the trap end 44 of the handle body 40 resides inside the interior of the cardboard tube 20 and the trap 10 is ready to be clamped in place using the clamp assembly.

The clamp assembly includes a base 56, a cone shaped balloon support 58 attached to the base 56 and a clamping tube 60 attached to the base. The clamping tube 60 has an interference fit with the collet fingers 54. When the clamping tube 60 is pushed over the collet fingers 54, the clamping tube 60 applies a squeezing pressure on the collet fingers 54 because of the interference fit. The base 56 is attached to the carriage 48. The carriage 48 has an inner diameter slightly larger than the outer diameter of the handle body 40 to allow the support assembly to be moved back and forth on the handle body 40. The base 56 joins the balloon support 58, clamping tube 60 and the carriage 48 together. Once the trap 10 has been inserted between the collet fingers 54 and the trap end 44 of the handle body 40, the clamp assembly is moved toward the trap end 44 until the clamping tube 60 is forced over the collet fingers 54 to apply the squeezing pressure on the outside surface of the collet fingers 54. When properly designed, this inward squeezing pressure of the clamping tube 60 on the collet fingers 54 applies an inward squeezing pressure on the trap 10 from the inside surface of the collet fingers 54. This pressure on the trap 10 holds the trap 10 in place so the balloon 14 can be inflated. Without a clamping mechanism, the build-up of air pressure in the balloon 14 when the balloon 14 is inflated would cause the trap 10 to fly off of the trap end 44 of the handle body 40. When properly designed, the squeezing pressure also holds the clamp assembly and carriage 48 in place on the handle body 40 due to friction and prevents the clamp assembly and carriage 48 from moving backward on the handle body 40 during use. The squeezing pressure should be enough to hold the trap 10 and clamp assembly in place during use, but not be so great the user struggles to move the clamp assembly forward on the tube 20 to clamp the trap 10 or move the clamp assembly backwards to release the trap 10 after operation. The portion of the balloon 14 stretched over the opening 36 of the cardboard tube 20 acts as a gasket to seal air inside the trap 10 and stop the air from escaping out between the bottom of the trap 10 and the trap end 44 of the handle body 40. That way any air forced through the handle body 40 flows into the interior of the cardboard tube 20 and does not escape around the outside of the trap 10.

The air pump is shown in FIG. 3 as a manual air pump with a pump handle 62, pump shaft 64 and pump mechanism 66. The pump handle 62 is connected to the pump shaft 64 and the pump shaft 64 is connected to the pump mechanism 66. The operator uses the pump handle 62 to move the pump shaft 64 back and forth in the two directions shown by arrows. The pump mechanism 66 is shown schematically, as any standard pumping device can be used to pump air into the trap 10. It is envisioned to use a dual action pumping device as the pump mechanism 66 to create air flow into the trap 10 when the pump shaft 64 is actuated in either direction. A dual action air pump device is preferred, because it inflates the balloon 14 of the trap 10 to the desired level with fewer pump strokes. The air pump is implemented with the handle assembly 40 so an air outlet port (not shown) of the air pump is inside the handle body 40 and air inlet ports (not shown) have access to outside of the handle body 40. This allows for the pumping action to increases the pressure inside the handle body 40 by pumping in outside air. Actuation of the air pump causes air to flow from the air outlet port, through the handle body 40 and into the interior area of the cardboard tube 20 of the trap 10. The number of times the pump shaft 64 is actuated back and forth determines the amount of inflation of the balloon 14. Air flow from the air pump into the cardboard tube 20 causes the air pressure inside cardboard tube 20 to increase and inflates the balloon 14. Air does not leak out of the wall 24 of the cardboard tube 20, even though cardboard is porous, because the balloon 14 about the outside surface of the cardboard tube 20 seals the cardboard tube 20 and air does not leak out the gap between the cardboard tube 20 and the edge 34 of the cardboard tube 20, because the balloon 14 is wrapped around the edge 34 of the cardboard tube 20 to act as a gasket. There are air pumps where the pumping device is in the pump handle 62 and provides the air via the pump shaft 64, which also could be implemented in the insect catcher.

Figure 5:
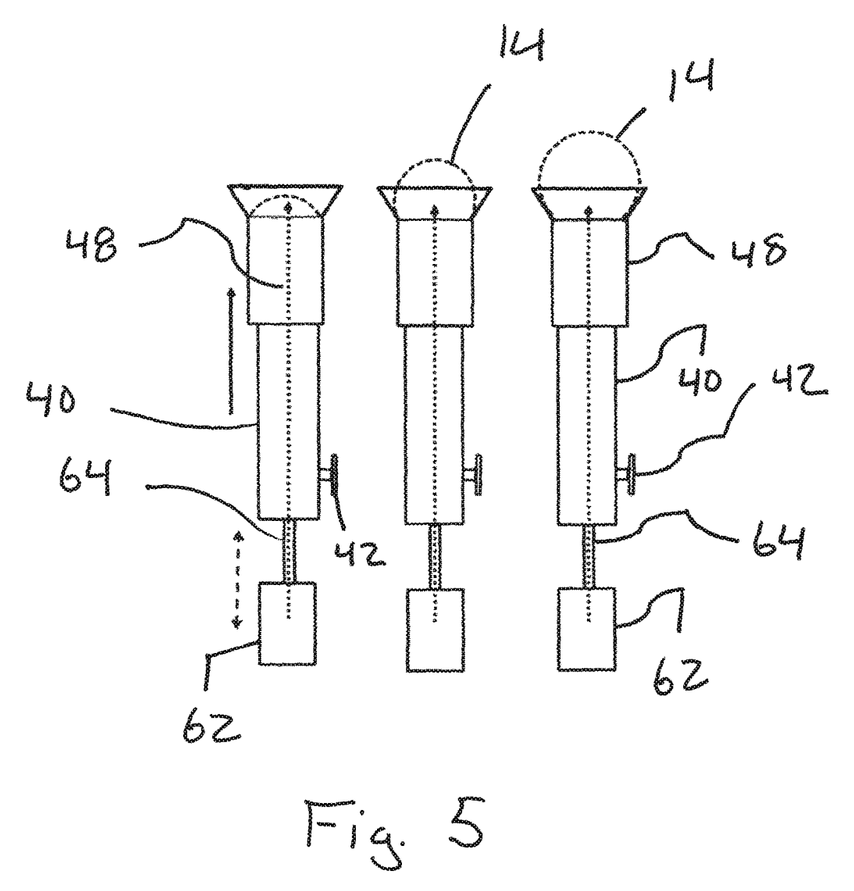
FIG. 5 is a side view of use of the insect trap according to the present invention.

Operation of the insect trap is as follows and shown in FIGS. 3 and 5. The disposable trap 10 is attached to the trap end 44 of the handle body 40 in a simple two step operation. First, the trap 10 is inserted over the trap end 44 of the handle body 40 so that the balloon covered cardboard tube 20 is placed between collet fingers 54 and the trap end 44 of the handle body 40. Second, with one motion, the operator clamps the trap 10 in place by sliding the clamp assembly over the trap 10 using the carriage 48. The balloon support 58 is shown as a cone because a cone shape provides good support to a round balloon 14 during inflation and when the balloon 14 is pressed against a surface. The balloon 14 is inflated to the desired size and firmness using the air pump. The amount of inflation is determined by the operator just before use in a particular insect trapping situation. For example, on a flat surface a greater size and firmness of the balloon 14 may be desired for increased area coverage and increased lateral stability of the balloon 14. When trapping an insect in a crevice or tight corner, less coverage and firmness might be required of the balloon 14. Where a smaller sized balloon that has more flexibility may be desired to be able to reach the insect in a crevice or tight corner, so a lower inflation level may be used. To deflate the balloon 14 after the insect is caught, the air pressure release device 42 on the handle body 40 is opened to release the air pressure from the balloon 14.

Figure 6:
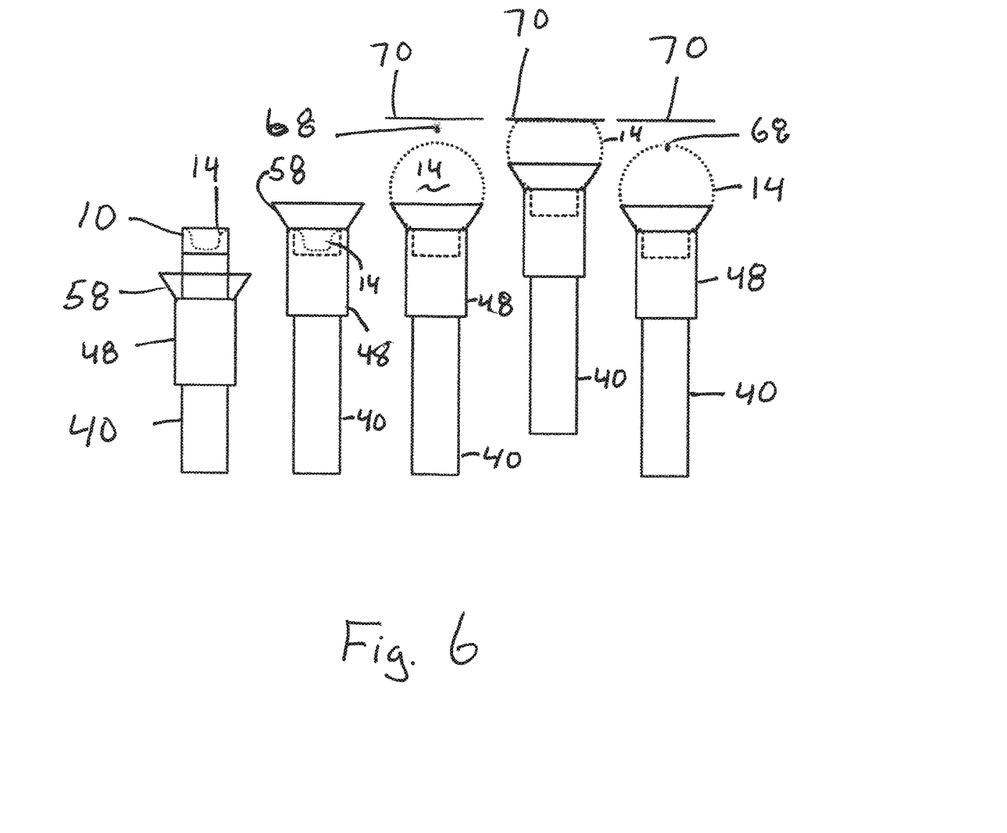
FIG. 6 is a side view of use of the insect trap according to the present invention.

FIG. 6 shows the steps of the trapping sequence, where only the top half of the insect catcher is shown for simplicity. First, the trap 10 is attached to the handle assembly 40. The support assembly is moved upward into position locking the trap 10 and balloon support 58 in place. The balloon 14 is inflated to the desired level. The balloon 14 is positioned under an insect 68 on a surface 70 and pushed onto the insect 68, so the balloon 14 engulfs the insect 68. The insect trap 72 is withdrawn from the surface 70 with the insect 68 adhered to the balloon 14 by the sticky substance layer 16. The trap 10 and handle assembly 40 are designed to be air tight when the trap 10 is inserted over the handle body 40, so that the balloon 14 stays inflated for a reasonable period of time to trap the insect 68.

Figure 7:
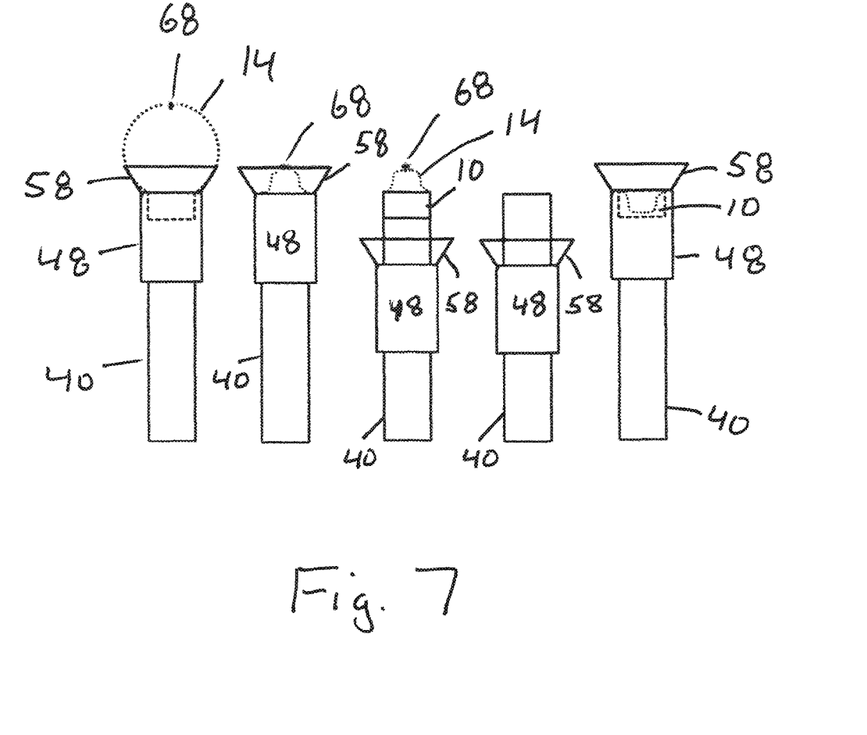
FIG. 7 is a side view of use of the insect trap according to the present invention.

Once the insect 68 is adhered onto the balloon 14, the trap 10 is ready for disposal. FIG. 7 shows the sequence of preparing the trap for disposal. The operator would inspect the balloon 14 to ensure that the insect 68 has been captured on the surface of the balloon 14. The operator would then actuate the air pressure release device 42 on the handle body 40. The air pressure release device 42 is shown as a release valve connected to the handle body 40 to allow for the release of air pressure from the handle body 40 by opening the release valve. Release of air pressure from the handle body 40 causes the balloon 14 to deflate. The balloon 14 is allowed to completely deflate while the insect 68 stays adhered to the balloon 14. The balloon 14 typically stays in the outward position after being deflated. The operator pulls the carriage 48 and hence the clamp assembly back away from the trap 10. Pulling back the clamp assembly unclamps the trap 10 from the collet fingers 54. Then, the operator points the trap end 44 of the handle body 40 with the trap 10 into a trash receptacle. Finally, the operator slightly actuates the air pump to give a small amount air pressure that forces the trap 10 away from the handle body 40 and into the trash receptacle. A new trap 10 can now be attached to the handle body 40 to prepare for the next insect capture. In this manner of operation, the operator does not need to come in contact or even close proximity of the trap 10 during insect capture, balloon deflation, or trap disposal.

It is envisioned that other embodiments can include the following features. The trap could come with a pre-inflated balloon and without inflation or deflation mechanisms in the handle assembly. An insecticide could also be applied to the outer surface of the balloon to ensure the insect is killed. The insecticide could be applied on top of the sticky substance layer and could be applied to the same or different areas of the balloon surface as the sticky substance layer. The sticky substance layer would hold the insect in close contact to the insecticide ensuring its effectiveness. A "no kill" version of this insect catcher is possible for those that do not wish the insect to be harmed, but just removed from the environment it is in. This is accomplished using a low tack sticky substance which does not hold the insect very strongly, so that the insect could be mechanically scraped off the surface of the balloon when it is placed outside. Alternatively, a water soluble adhesive could be used for the sticky substance layer to initially capture the insect and then the insect and adhesive could be washed from the balloon surface outdoors using tap water. The handle body could have curved or angled portions to reach around surfaces such as toilets, sinks and couches. The curved or angled sections could be added in the form of quick change inserts or portions of the handle. The curved section could be adjustable to different curves using so called "goose neck" devices. The handle body could be one fitted with a flashlight for viewing in dimly lit room. The air pump could be an electric air pump or replaceable compressed gas cylinders. Any fluid, meaning gas or liquid could be used to inflate the balloon. The insect catcher could be constructed with no air pressure release valve included and the trap would simply be unclamped from the handle body, allowing the air to escape. Some operators with more extreme insect phobias would prefer to have the insect farther down into the trap when they dispose of it. There can be an option to have a suction device to provide slight suction to the inside of the balloon after deflation. The applied suction would pull the balloon down into container and invert the balloon in the inward position shown in FIG. 1 to form a pouch to hold the insect in the container. A lid could be used on top of the trap after the balloon is inverted, so that the insect is held in a pouch within the closed container. The trap could have a clamp assembly designed to clamp the trap to the handle assembly, instead of the clamp assembly described for the handle assembly. It is also envisioned that the trap and handle assembly can be hand launched or fired from a device at the insect.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

I claim:

1. An insect catcher for trapping insects, comprising:
   a handle assembly to receive and manipulate a trap for trapping insects, said handle assembly of such structure for allowing said handle assembly to be used to apply pressure to said trap against the insects;
   a disposable trap to capture and dispose of an insect without an operator of said handle assembly contacting the insect, said trap removably attached to said handle assembly so said trap can be removed and disposed of;
   an inflatable material as part of said trap which expands and is adapted to have direct contact with the insect to be trapped and retained in said trap to be disposed of when said trap is removed from said handle assembly and disposed; and
   wherein said handle assembly includes a support to support said inflatable material while said inflatable material is expanded.

2. The insect catcher of claim 1, wherein said handle assembly is reusable and said trap is disposable.

3. The insect catcher of claim 1, wherein said inflatable material is a balloon.

4. The insect catcher of claim 1, further including a sticky substance layer on said inflatable material, said sticky substance layer adapted for pressing against the insect so that the insect adheres to said inflatable material.

5. The insect catcher of claim 1, further including an insecticide on said inflatable material.

6. The insect catcher of claim 1, wherein said trap comprises:
   a container, said container being a tube having a first end for connection to said handle assembly and a second end for said inflatable material to expand from; and
   said inflatable material attached to said container such that said inflatable material can be inflated while attached to said container.

7. The insect catcher of claim 6, wherein said inflatable material is a balloon that inflates beyond said container and further including a sticky substance layer on said inflatable material.

8. The insect catcher of claim 7, further including a sticky substance layer on said inflatable material, said sticky substance layer adapted for pressing against the insect so that the insect adheres to said inflatable material.

9. The insect catcher of claim 1, wherein said trap includes a clamp assembly to clamp said trap to said handle assembly.

10. The insect catcher of claim 1, further including an inflation device to provide a fluid to said trap to inflate said inflatable material.

11. The insect catcher of claim 10, wherein said inflation device is an air pump installed in said handle assembly.

12. The insect catcher of claim 1, wherein said handle assembly includes a clamp assembly to clamp said trap to said handle assembly.

13. The insect catcher of claim 3, wherein said handle assembly includes a balloon support to support said balloon during use.

14. The insect catcher of claim 1, wherein said handle assembly includes a pressure release device to deflate said inflatable material.

15. The insect catcher of claim 1, further includes a suction device to pull said inflatable material with the caught insect into said trap for disposal.

16. The insect catcher of claim 6, wherein said container is a tube and wherein said handle assembly includes a clamp assembly on a trap end of said handle assembly to receive said container of said trap comprising:
   a collet fitted on said trap end of said handle assembly, said collet including flexible collet fingers, and where there is a clamp space between said trap end and said flexible collet fingers to receive a wall of said container between said trap end and said flexible collet fingers; and
   a clamping tube, said clamping tube configured to move over said collet fingers and pressure said collet fingers against said container to clamp said trap in place.

17. The insect catcher of claim 16, wherein said handle assembly includes an air pump to force air into said inflatable material to inflate said inflatable material during use.

18. The insect catcher of claim 17, wherein said handle assembly includes an air pressure release device to deflate said inflatable material during use.

19. The insect catcher of claim 16, wherein said handle assembly includes a suction device to pull said inflatable material into said container.

* * * * *